(12) United States Patent
Tseng et al.

(10) Patent No.: US 10,542,197 B2
(45) Date of Patent: Jan. 21, 2020

(54) ELECTRONIC DEVICE AND OPERATING METHOD THEREOF

(71) Applicant: Compal Electronics, Inc., Taipei (TW)

(72) Inventors: Yu-Hao Tseng, Taipei (TW);
Kun-Hsuan Chang, Taipei (TW);
Hsin-Chieh Cheng, Taipei (TW);
Wei-Jun Wang, Taipei (TW); Ting-Wei Wu, Taipei (TW); Ming-Che Weng, Taipei (TW)

(73) Assignee: Compal Electronics, Inc., Taipei (TW)

(*) Notice: Subject to any disclaimer, the term of this patent is extended or adjusted under 35 U.S.C. 154(b) by 0 days.

(21) Appl. No.: 15/979,419

(22) Filed: May 14, 2018

(65) Prior Publication Data
US 2019/0289177 A1    Sep. 19, 2019

(30) Foreign Application Priority Data

Mar. 19, 2018  (TW) .............................. 107109271 A (51) Int. Cl.
*H04N 5/225* (2006.01)
*H04N 5/74* (2006.01)
*H04N 5/232* (2006.01)

(52) U.S. Cl.
CPC ....... *H04N 5/2256* (2013.01); *H04N 5/23229* (2013.01); *H04N 5/7475* (2013.01); *H04N 2005/7483* (2013.01)

(58) Field of Classification Search
None
See application file for complete search history.

(56) References Cited

U.S. PATENT DOCUMENTS 8,382,295 B1*  2/2013  Kim .................... H04N 9/31
                                                 348/552

FOREIGN PATENT DOCUMENTS

TW    M452294 U1    5/2013
TW    201618061 A   5/2016

* cited by examiner

*Primary Examiner* — Mark T Monk (57) ABSTRACT

An electronic device includes an illumination module, an image projection module, a camera module and at least one processor. The processor, coupled to the illumination module, the image projection module and the camera module, determines that the electronic device executes a first or second operating mode according to an operation instruction of a user. When the first operating mode is executed, the processor enables the illumination module to generate a medium color temperature light, simultaneously enables the image projection module to project a window screen onto a plane, and allows the use to operate the window screen on the plane. When the second operating mode is executed, the processor enables the illumination module to generate a high color temperature light, simultaneously enables the image projection module to project a preset pattern onto the plane, and turns on the camera module to allow the user to take photo or image.

12 Claims, 6 Drawing Sheets

ELECTRONIC DEVICE AND OPERATING METHOD THEREOF

FIELD OF THE INVENTION

The present invention relates to an electronic device and an operating method thereof, and more particularly to an electronic device with a plurality of operating modes and an operating method thereof.

BACKGROUND OF THE INVENTION

With the development of the technology of the projector-related industries, the size of the image projection module can be greatly reduced. Therefore, in recent years, image projection modules have gradually been integrated into other electronic devices such as desktop computers. However, if a conventional electronic device with a projection function uses a built-in camera module for photographing or image capturing, it must manually close the image projection module manually and there is no guarantee that it will not be disturbed by ambient light sources when the camera module is shooting. Therefore, in order to avoid the interference of the ambient light source and at the same time increases the usage scenarios that the electronic device can use, it is necessary to provide an electronic device having a plurality of operating modes and an operating method thereof.

SUMMARY OF THE INVENTION

An objective of the present invention is to provide an electronic device having a plurality of operating modes and an operating method thereof. To achieve the above objective, an embodiment of the present invention provides an electronic device. The electronic device includes an illumination module, an image projection module, a camera module and at least one processor. The processor is coupled to the illumination module, the image projection module and the camera module. The processor determines that the electronic device executes a first operating mode or a second operating mode according to an operation instruction of a user. When the first operating mode is executed, the processor enables the illumination module to generate a medium color temperature light, simultaneously enables the image projection module to project a window screen onto a plane, and allows the use to operate the window screen on the plane. When the second operating mode is executed, the processor enables the illumination module to generate a high color temperature light, simultaneously enables the image projection module to project a preset pattern onto the plane, and turns on the camera module to allow the user to take at least one photo or image.

An embodiment of the present invention further provides an operating method of an electronic device. The electronic device includes an illumination module, an image projection module, a camera module and at least one processor. The operating method includes steps of: configuring the processor to determine that the electronic device executes a first operating mode or a second operating mode according to an operation instruction of a user; when the first operating mode is executed, configuring the processor to enable the illumination module to generate a medium color temperature light, simultaneously enable the image projection module to project a window screen onto a plane, and allow the use to operate the window screen on the plane; and when the second operating mode is executed, configuring the processor to enable the illumination module to generate a high color temperature light, simultaneously enable the image projection module to project a preset pattern onto the plane, and turn on the camera module to allow the user to take at least one photo or image.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
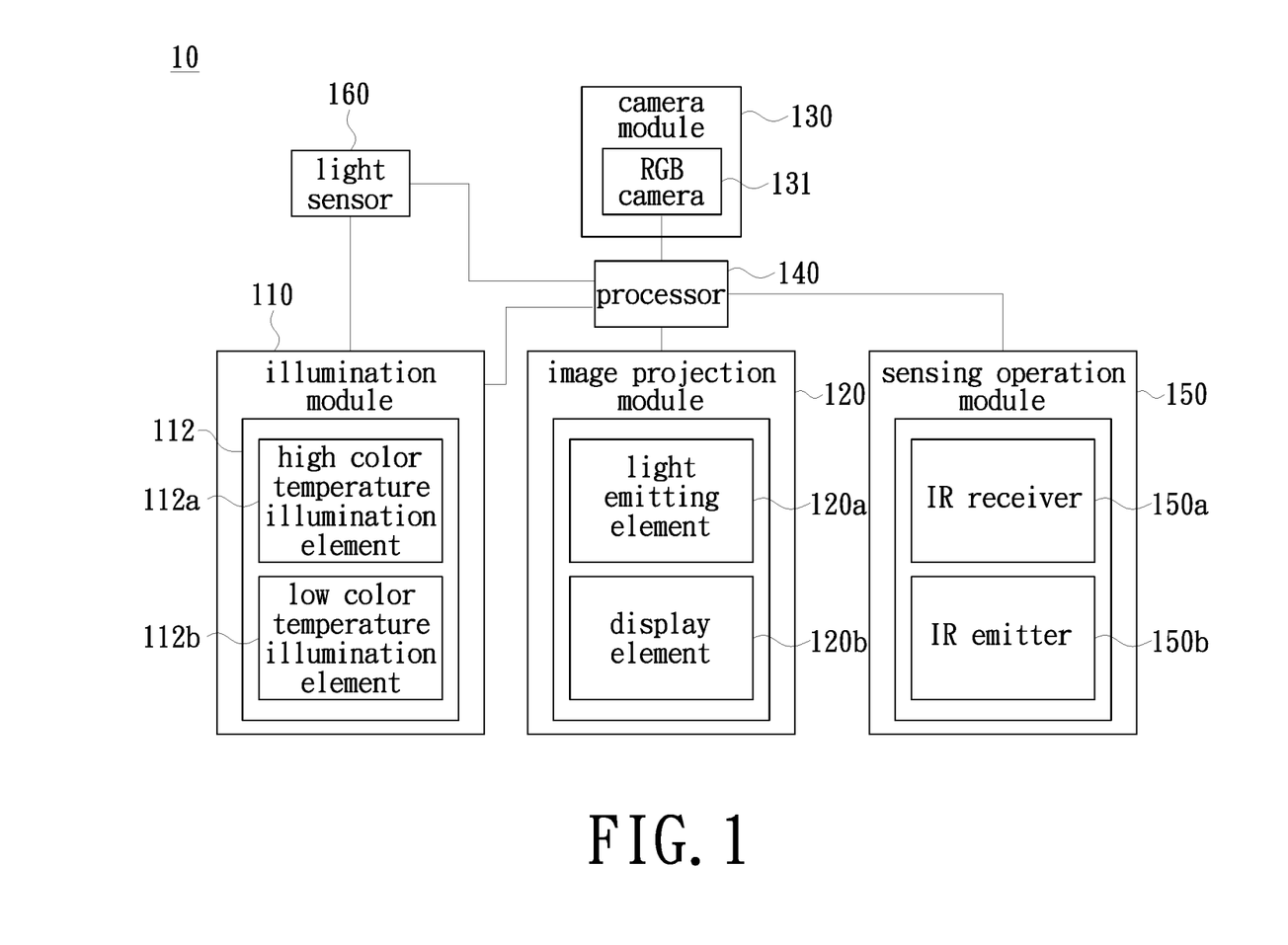
FIG. 1 is a functional block diagram of an electronic device provided by an embodiment of the present invention.

Please refer to FIG. 1. FIG. 1 is a functional block diagram of an electronic device provided by an embodiment of the present invention. The electronic device 10 mainly includes an illumination module 110, an image projection module 120, a camera module 130 and at least one processor 140. It should be noted that in order to facilitate the following description, the present embodiment only adopts one processor 140 for the illustration, but the present invention it not limited thereto. In addition, the illumination module 110, the image projection module 120, the camera module 130 and the processor 140 may be implemented through a pure hardware circuit, or implemented through a hardware circuit with firmware or software, and the present invention is not limited thereto. In addition, the above elements may be integrated or separated, and the present invention is not limited thereto.

In the present embodiment, the processor 140 is coupled to the illumination module 110, the image projection module 120 and the camera module 130, and determines that the electronic device 10 executes the first operating mode or the second operating mode according to an operation instruction of a user. It should be noted that the above operation instruction may be obtained by a user pressing a physical or virtual button (not shown) on the electronic device 10, or may be obtained by the user performing gesture control through the sensing operation module 150. In summary, the present invention does not limit the specific implementation of the operation instructions. That is, in the present embodiment, the user can directly select an operating mode of the electronic device 10 according to actual needs or applications.

Figure 2A:
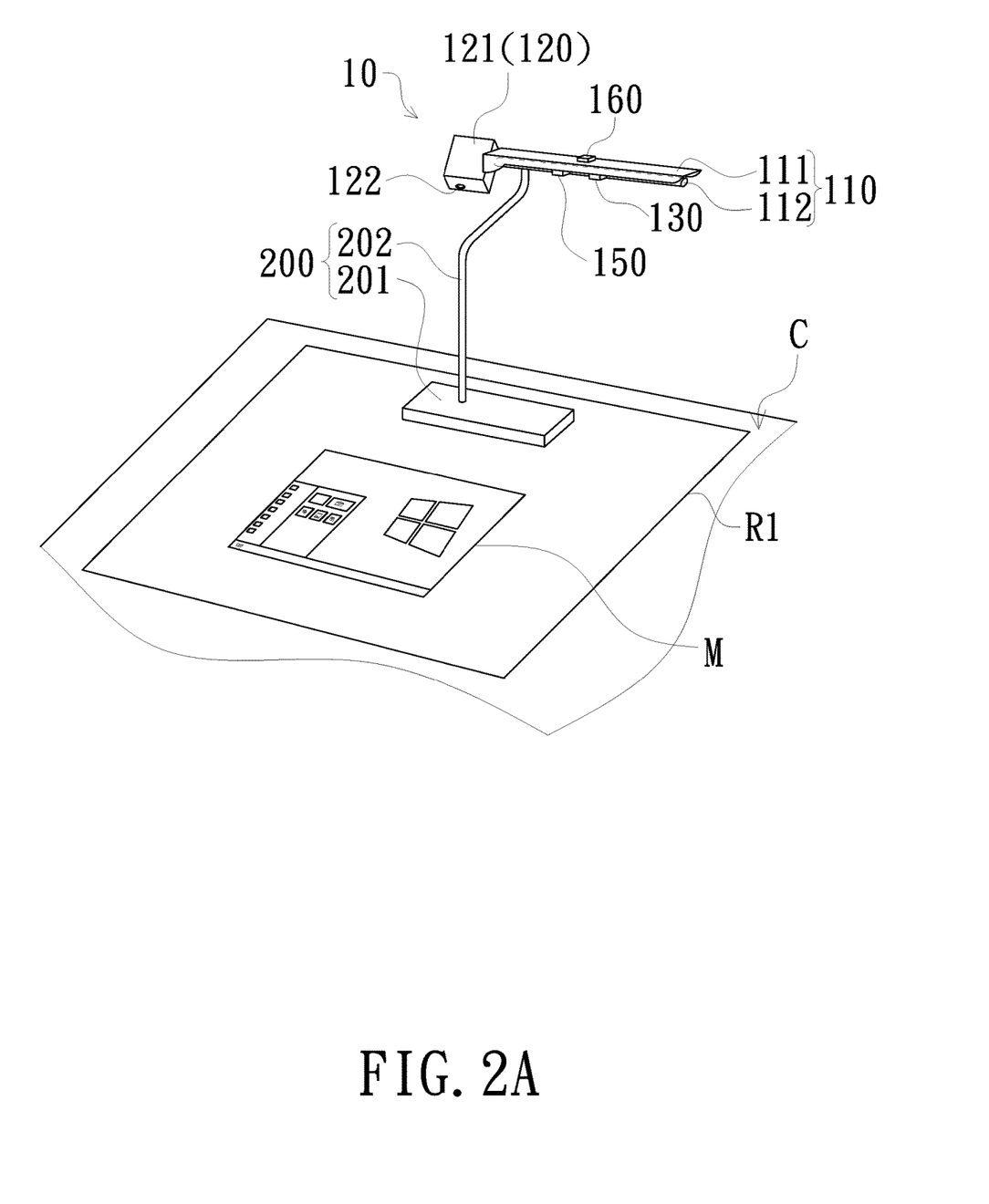
FIG. 2A is a schematic diagram of a usage scenario when the electronic device of FIG. 1 executes a first operating mode.
Figure 2B:
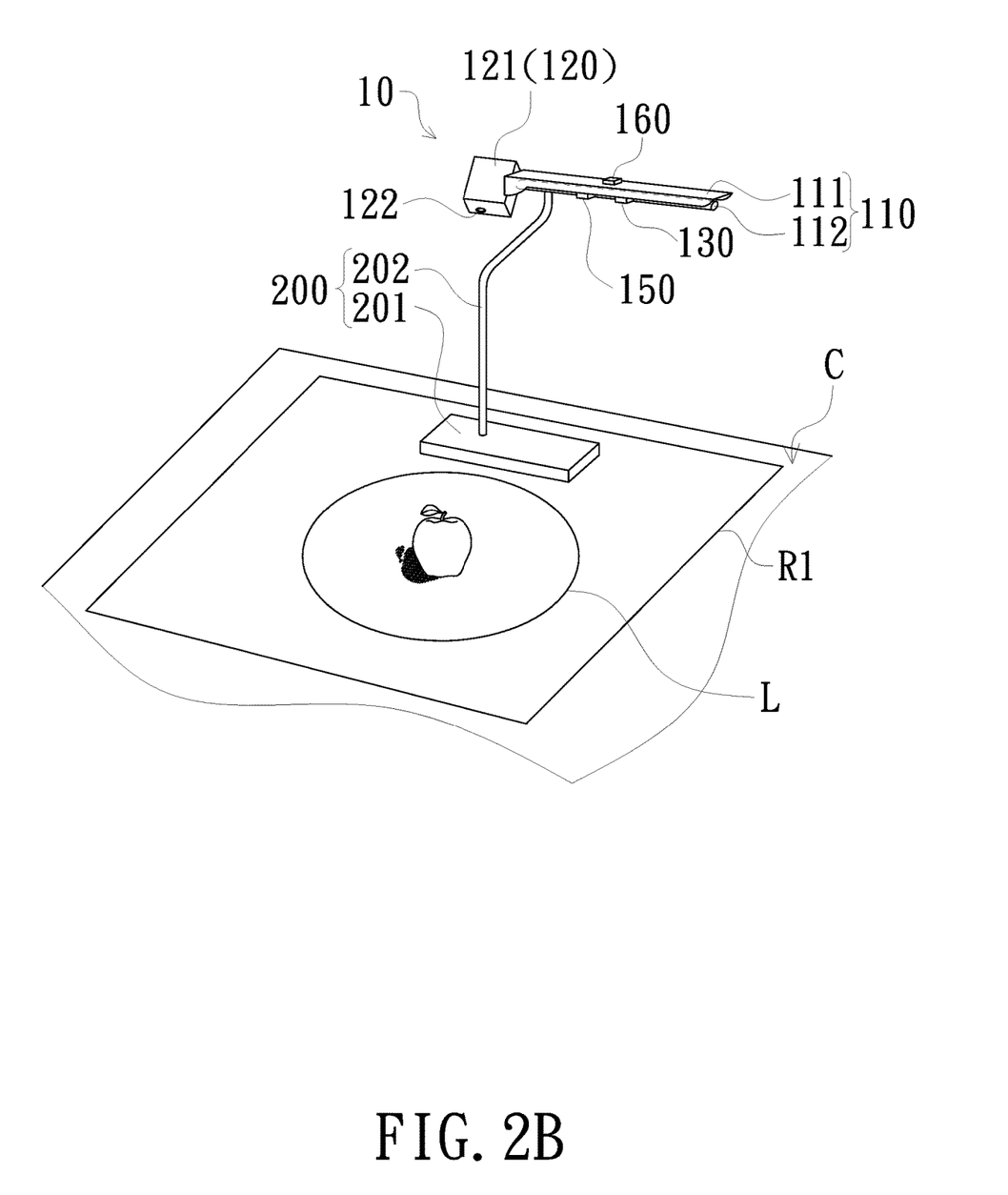
FIG. 2B is a schematic diagram of a usage scenario when the electronic device of FIG. 1 executes a second operating mode.

Then, please also refer to FIG. 2A and FIG. 2B. FIG. 2A and FIG. 2B illustrate the specific details of the electronic device 10 when executing the first or second operating mode. As shown in FIG. 2A, the electronic device 10 may further include a frame body 200. The frame body 200 includes, for example, a base 201 for placing on the plane C and a support frame 202 connected to the base 201. In the present embodiment, the plane C is a bearing plane. The processor 140 may be built in the base 201 or may be disposed in an external device (for example, a host computer) that is electrically connected to the electronic device 10, but the present invention is not limited thereto. In order to facilitate the following description, the processor 140 will not be shown in FIGS. 2A and 2B.

In addition, the illumination module 110 is connected to the support frame 202 and faces the plane C for illuminating the illumination beam onto the plane C to form the illumination area R1. Specifically, the illumination module 110 is a brightness-adjustable illumination device, which includes, for example, a lamp cover 111 and a light emitting element 112 fixed on the lamp cover 111. The light emitting element 112 can be used to generate light of different color temperatures. According to the above teachings, it should be understood that the light emitting element 112 may include, for example, a high color temperature illumination element 112a and a low color temperature illumination element 112b. In order to facilitate the following description, the high color temperature illumination element 112a and the low color temperature illumination element 112b are only shown in the functional block diagram of FIG. 1. It should be noted that the outline of the illumination area R1 in the present embodiment is only for illustration, and the present invention is not limited thereto.

On the other hand, the image projection module 120 is pivotally connected to the lamp cover 111 and includes, for example, a housing 121, a projection lens 122, and a light emitting element 120a and a display element 120b disposed in the housing 121. In practice, the display element 102b is used to convert the illumination beam provided by the light emitting element 120a in the housing 121 into an image beam, and the projection lens 122 is used to project the image beam onto the plane C. In addition, the camera module 130 is disposed on the lamp cover 111 and includes, for example, at least one RGB camera 131, but the present invention is not limited thereto. Similarly, in order to facilitate the following description, the light emitting element 120a, the display element 120b and the RGB camera 131 are also only shown in the functional block diagram of FIG. 1. In summary, since the operating principles of the illumination module 110, the image projection module 120 and the camera module 130 are well known to those of ordinary skill in the art, no redundant detail is to be given herein.

Taking FIG. 2A as an example, when the first operating mode is executed, the processor 140 enables the illumination module 110 to generate a medium color temperature light (e.g., color temperature may be 4000 K-4500 K), simultaneously enables the image projection module 120 to project a window screen M onto the plane C, and allows the user to operate the window screen M on the plane C. It can be seen from the above content that the first operating mode can be a computer window operating mode. That is, the window screen M projected by the image projection module 120 is an operation system screen or a program execution screen. However, in order to allow the user to directly operate the projected window screen M on the plane C, the plane C of the present embodiment is also an operation plane, and the electronic device 10 may further include a sensing operation module 150 as an input interface of the electronic device 10.

The sensing operation module 150 is coupled to the processor 140. When the electronic device 10 executes the first operating mode, the processor 140 also enables the sensing operation module 150 to sense the operation of the user on the window screen M. In practice, the sensing operation module 150 may include, for example, at least one IR receiver 150a and at least one IR emitter 150b, which are disposed in the illumination module 110 as shown in FIG. 2A or other suitable positions. In summary, the present invention does not limit the specific implementation of the sensing operation module 150, and since the sensing operation module 150 is already known to those of ordinary skill in the art, no redundant detail is to be given herein.

According to the above teachings, those skilled in the art should understand that when the electronic device 10 executes the first operating mode, the objective of enabling the illumination module 110 to generate the medium color temperature light is to facilitate the user to operate the projected window screen M. However, the electronic device 10 may further include a light sensor 160 in the present embodiment if the influence of the ambient light source is considered. The light sensor 160 is coupled to the processor 140 and the illumination module 110, and is used to sense ambient light brightness within the range where the electronic device 10 locates. Taking FIG. 2A as an example, the light sensor 160 may be disposed on the side of the illumination module 110 away from the plane C. However, the number and location of the light sensing elements of the light sensor 160 may be determined according to design requirements, and is not necessarily limited to FIG. 2.

Specifically, when the electronic device 10 executes the first operating mode, the illumination module 110 can dynamically adjust the illumination brightness and/or the luminous flux of the high color temperature illumination element 112a and low color temperature illumination element 112b according to the ambient light brightness sensed by the light sensor 160. When the ambient light brightness is higher than a threshold, for example, 40 lux, the processor 140 disables the illumination module 110 to generate the medium color temperature light. That is, in the case of insufficient ambient light brightness, the illumination module 110 will automatically lower the illumination brightness and/or the luminous flux of the high color temperature illumination element 112a and the low color temperature illumination element 112b. As such, the projected window screen M is not interfered with strong light and the contrast between the projected window screen M and ambient light can be reduced at the same time, thereby preventing the user's eyes from being easily feel tired and even getting hurt. Similarly, when the ambient light brightness is sufficient (that is, when the ambient light brightness is greater than the aforementioned threshold), the illumination module 110 may preferably be turned off so as not to generate the medium color temperature light, thereby achieving the effect of power saving. In summary, the implementation manners described above are only examples here, and the present invention is not limited thereto. Those skilled in the art should be able to adjust the design of the light source based on the actual light according to actual needs or applications.

On the other hand, taking FIG. 2B as an example. When the second operating mode is executed, the processor 140 enables the illumination module 110 to generate high color temperature light, simultaneously enables the image projection module 120 to project a preset pattern L onto the plane C, and turns on the camera module 130 to allow the user to take at least one photo or image. It can be known from the above content that the second operating mode can be the camera operating mode, and it should be understood that the objective of the image projection module 120 projecting the preset pattern L onto the plane C is to prompt the user to place the external object to be photographed (for example, the apple in FIG. 2B) in the preset pattern L so that the photographed photo or image can have the best visual angle. It should be noted that the outline of the preset pattern L in FIG. 2B is merely for illustration, and the present invention is not limited thereto.

In addition, according to the teaching of the above contents, those skilled in the art should understand that the aforementioned high color temperature illumination element 112a may be, for example, a white light source. That is, when the electronic device 10 executes the second operating mode, the illumination module 110 is enabled to automatically adjust and generate a white light source to supplement the light, so as to avoid the interference of the ambient light source and to make the camera module 130 shoot a photo or image with high color rendering, so the color temperature can be 5500-6000 K. However, in order to highlight the apple photographed by the camera module 130 is a real object, the apple in FIG. 2B contains a shadow, but it should be understood that the white light of the illumination module 110 has been used in the present embodiment and therefore the apple in FIG. 2B should no longer contain shadows after the light source has been supplemented with light (i.e., with sufficient light). In summary, since the effect of the white light source on the camera module 130 is well known to those having ordinary knowledge in the art, no redundant detail is to be given herein.

It should be noted that in the present embodiment, since the camera module 130 can determine whether to start shooting by means of gesture control, the sensing operation module 150 can be turned on but does not function before the camera module 130 takes a photo or image, and the sensing operation module 150 starts to function after the camera module 130 takes a photo or image. That is, when the electronic device 10 executes the second operating mode and the user is using the camera module 130 to take a photo or image, the processor 140 may disable the sensing operation module 150 to make it in a stand-by state to avoid misjudgment on gesture control.

However, in other embodiments, the camera module 130 can also determine whether to start shooting by corresponding physical buttons; therefore, when the electronic device 10 executes the second operating mode, the processor 140 can also directly disable the sensing operation module 150 to make it in a turn-off state so as to avoid unnecessary data processing burden. In summary, the implementation manners described above are only examples here, and the present invention is not limited thereto. Those skilled in the art should be able to perform related designs based on actual needs or applications.

Similarly, when the electronic device 10 executes the second operating mode, the illumination module 110 can dynamically adjust the illumination brightness and/or the luminous flux of the high color temperature illumination element 112a according to the ambient light brightness sensed by the light sensor 160 if the influence of the ambient light source is considered. When the ambient light brightness is higher than a threshold, the processor 140 disables the illumination module 110 to generate the high color temperature light. Since the operating principle of using the light sensor 160 is also as described in the above embodiment, no redundant detail is to be given herein.

Figure 2C:
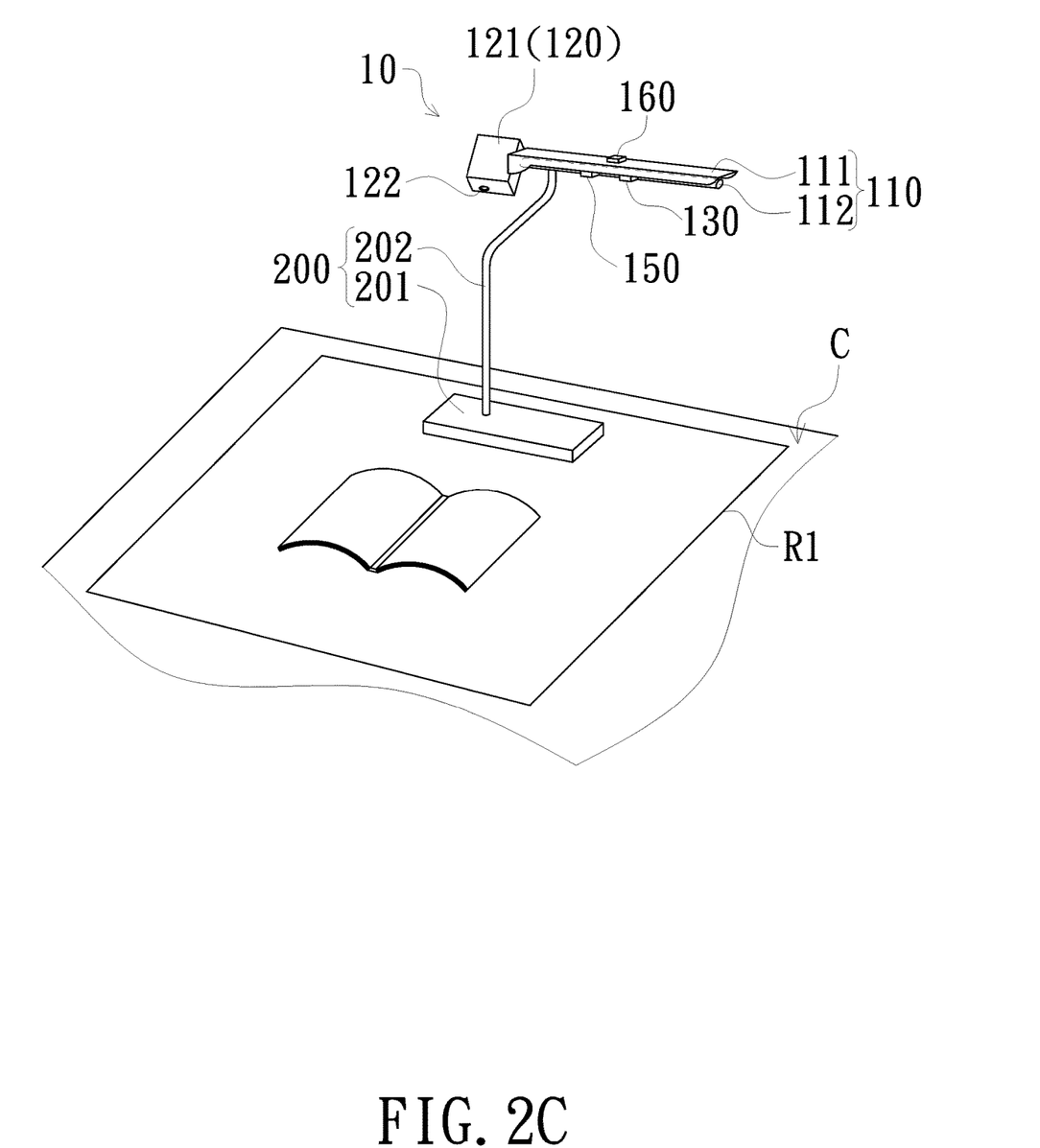
FIG. 2C is a schematic diagram of a usage scenario when the electronic device of FIG. 1 executes a third operating mode.

Further, if it is considered that the electronic device 10 having a lighting function can also only be used as a desk lamp, in the present embodiment, the electronic device 10 can further have a third operating mode, and it should be understood that the processor 140 also determines that the electronic device 10 executes the first, second, or third operating modes based on the user's operation instructions. Referring to FIG. 2C too. FIG. 2C is a schematic diagram of a scenario when the electronic device of FIG. 1 executes a third operating mode. When executing the third operating mode, the processor 140 enables the illumination module 110 to generate low color temperature light, and simultaneously enables the image projection module 120 to project a completely black screen onto the plane C or disables the image projection module 120 to make it in a turn-off state, so as to prevent the reading from being disturbed by the color of the projection screen.

It should be known from the above content that the third operating mode can be the reading mode, and the aforementioned low color temperature illumination element 112b can be, for example, a yellow light source. That is, when the electronic device 10 executes the third operating mode, the illumination module 110 is enabled to automatically adjust to generate a yellow light source to suit the user's reading of magazines and documents, so as to reduce the short-wavelength blue light damage to the macular area of the user's eye macular area, wherein the color temperature can be 2800-3300 K. Since the operation principle of the image projection module 120 in the reading mode is already known to those having ordinary knowledge in the art, no redundant detail is to be given herein. Similarly, when the third operating mode is performed, the illumination module 110 can dynamically adjust the illumination brightness and/or the luminous flux of the aforementioned low color temperature illumination element 112b according to the ambient light brightness sensed by the light sensor 160 if the influence of the ambient light source is considered. When the ambient light brightness is higher than a threshold, the processor 140 disables the illumination module 110 to generate the aforementioned low color temperature light.

In addition, in order to prevent the user from mistakenly activating other functions, in the present embodiment, the camera module 130 and the sensing operation module 150 may be turned on but not function when the third operating mode is performed. Or, in other embodiments, when the third operating mode is performed, the processor 140 can directly disable the camera module 130 and the sensing operation module 150 to make them all in the turn-off state, so as to avoid misuse of the user. In summary, the implementations described above are only examples here, and the present invention is not limited thereto. Those skilled in the art should be able to perform related designs based on actual needs or applications.

Figure 3A:
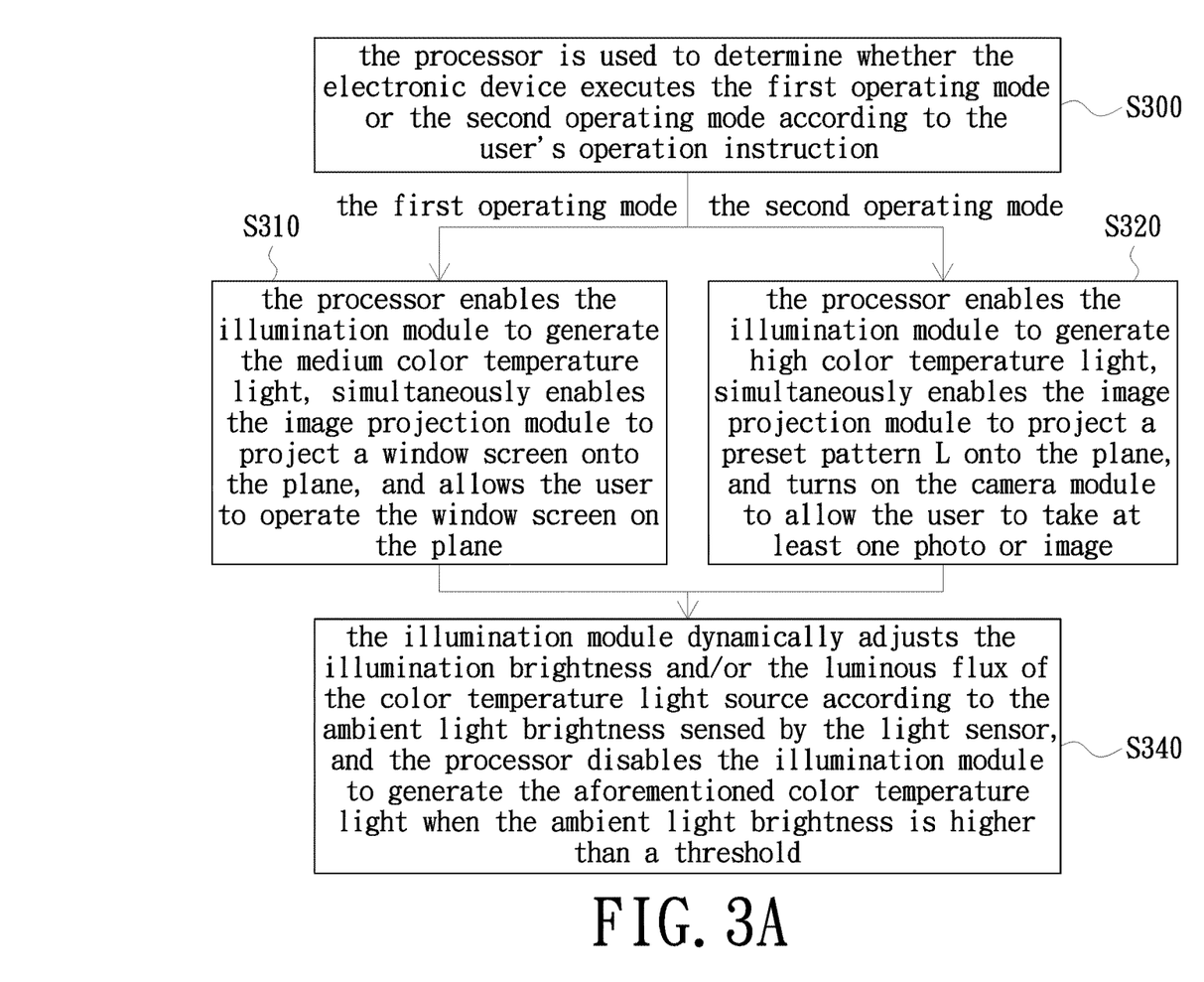
FIG. 3A is a schematic flowchart of an operating method of an electronic device according to an embodiment of the present invention.

Finally, in order to further explain the operation flow of the electronic device 10, the present invention further provides an implementation of an operating method of the electronic device 10. Referring to FIG. 3A. FIG. 3A is a schematic flowchart of an operating method of an electronic device according to an embodiment of the present invention. It should be noted that the operating method shown in FIG. 3A may be performed on the electronic device 10 shown in FIG. 1 to FIG. 2B, so please also refer to FIG. 1 to FIG. 2B for better understanding, but the present invention does not limit the operating method of FIG. 3A only to the electronic device 10 of FIG. 1 to FIG. 2B. In addition, since the detailed step flow is as described in the above embodiments, it is only summarized here and no redundant detail is to be given herein.

As shown in FIG. 3A, first, in step S300, the processor 140 is used to determine whether the electronic device 10 executes the first operating mode or the second operating mode according to the user's operation instruction. When the first operating mode is executed, step S310 is performed. In step S310, the processor 140 enables the illumination module 110 to generate the medium color temperature light, simultaneously enables the image projection module 120 to project a window screen M onto the plane C, and allows the user to operate the window screen M on the plane C. When the second operating mode is executed, step S320 is performed. In step S320, the processor 140 enables the illumination module 110 to generate high color temperature light, simultaneously enables the image projection module 120 to project a preset pattern L onto the plane C, and turns on the camera module 130 to allow the user to take at least one photo or image.

Similarly, no matter the electronic device 10 executes the first or second operating mode, the step S340 and the step S320 may also include step S340 if the influence of the ambient light source is considered. In step S340, the illumination module 110 dynamically adjusts the illumination brightness and/or the luminous flux of the aforementioned color temperature light source (i.e., the low color temperature illumination element 112*b* and/or the high color temperature illumination element 112*a*) according to the ambient light brightness sensed by the light sensor 160, and the processor 140 disables the illumination module 110 to generate the aforementioned color temperature light when the ambient light brightness is higher than a threshold.

Figure 3B:
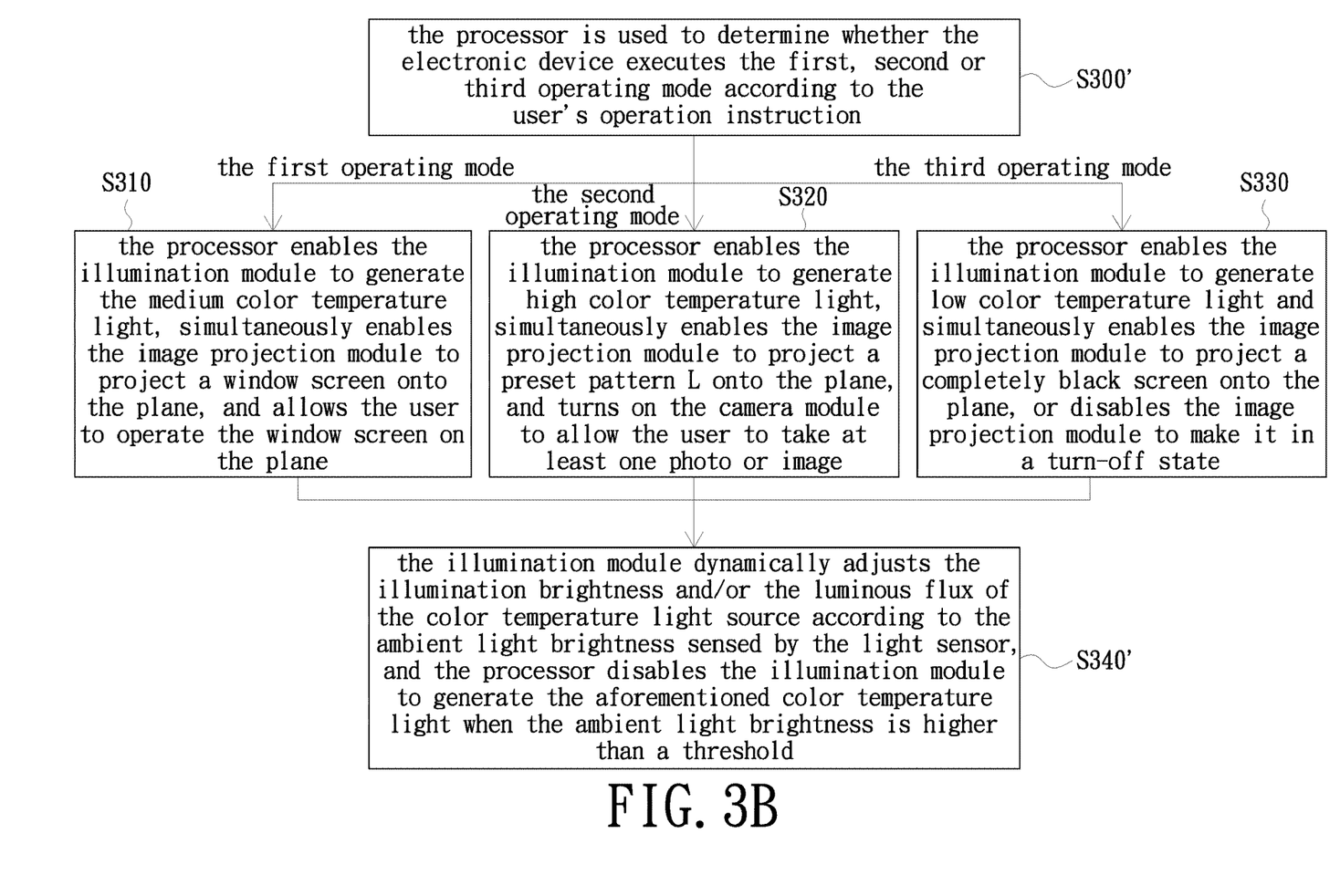
FIG. 3B is a schematic flowchart of an operating method of an electronic device according to another embodiment of the present invention.

However, as described above, since the electronic device 10 can further have a third operating mode, please refer to FIG. 3B together. FIG. 3B is a schematic flowchart of an operating method of an electronic device according to another embodiment of the present invention. It should be noted that the operating method shown in FIG. 3B may be performed in the electronic device 10 shown in FIG. 1 to FIG. 2C, so please also refer to FIG. 1 to FIG. 2C for better understanding, but the present invention does not limit that the operating method of FIG. 3B can only be performed in the electronic device 10 shown in FIG. 1 to FIG. 2C. In addition, the flow steps in FIG. 3B that are the same as or similar to those in FIG. 3A are denoted by the same or similar figure numbers, and thus no redundant detail is to be given herein.

Compared with step S300 of FIG. 3A, step S300' of FIG. 3B is that the processor 140 determines whether the electronic device 10 executes the first, second or third operating modes according to the user's operation instruction. When the third operating mode is executed, step S330 is performed. In step S330, the processor 140 enables the illumination module 110 to generate low color temperature light and simultaneously enables the image projection module 120 to project a completely black screen onto the plane C, or disables the image projection module 120 to make it in a turn-off state and thereby preventing the color of the projection screen from interfering with reading.

Similarly, no matter the electronic device 10 executes the first, second or third operating mode, the step S340, the step S320 and the step S330 may also include step S340' if the influence of the ambient light source is considered. In step S340', the illumination module 110 dynamically adjusts the illumination brightness and/or the luminous flux of the aforementioned color temperature light source (i.e., the low color temperature illumination element 112*b* and/or the high color temperature illumination element 112*a*) according to the ambient light brightness sensed by the light sensor 160, and the processor 140 disables the illumination module 110 to generate the aforementioned color temperature light when the ambient light brightness is higher than a threshold.

On the other hand, according to the above teachings, it should be understood that the so-called "first, second and third operating modes" here means "the medium color temperature operating mode, the high color temperature operating mode, and the low color temperature operating mode" or "operating mode, shooting mode, and reading mode", respectively. In other words, when the electronic device 10 executes the high color temperature operating mode, the processor 140 enables the high color temperature illumination element 112*a* in the illumination module 110 to generate high color temperature light; when the electronic device 10 executes the low color temperature operating mode, the processor 140 enables the low color temperature illumination element 112*b* in the illumination module 110 to generate low color temperature light; and when the electronic device 10 executes the medium color temperature operating mode, the processor 140 enables the high color temperature illumination elements 112*a* and the low color temperature illumination elements 112*b* in the illumination module 110 to generate the medium color temperature light. In summary, because the detailed step flow is as described in the above embodiment, no redundant detail is to be given herein.

In summary, the electronic device and the operating method thereof provided in the embodiments of the present invention may correspondingly adjust the built-in image projection module and the camera module of the electronic device to the corresponding operating modes according to different operation instructions so that the illumination module can generate a suitable color temperature light, and then further adjusts the illumination brightness and/or the luminous flux of the aforementioned color temperature light source according to the ambient light brightness sensed by the light sensor, so as to avoid the interference of the ambient light source, and at the same time the usage situation that the electronic device can use is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
   an illumination module;
   an image projection module;
   a camera module;
   and at least one processor, coupled to the illumination module, the image projection module and the camera module, wherein the processor determines that the electronic device executes a first operating mode or a second operating mode according to an operation instruction of a user,
   wherein when the first operating mode is executed, the processor enables the illumination module to generate a medium color temperature light, simultaneously enables the image projection module to project a window screen onto a plane, and allows the user to operate the window screen on the plane,
wherein when the second operating mode is executed, the processor enables the illumination module to generate a high color temperature light, simultaneously enables the image projection module to project a preset pattern onto the plane, and turns on the camera module to allow the user to take at least one photo or image.

2. The electronic device according to claim 1, wherein the camera module comprises at least one RGB camera.

3. The electronic device according to claim 1, further comprising a sensing operation module coupled to the processor, wherein when the electronic device executes the first operating mode, the processor enables the sensing operation module to sense the user's operation on the window screen, wherein when the electronic device executes the second operating mode, the processor disables the sensing operation module to make the sensing operation module in a stand-by state.

4. The electronic device according to claim 3, wherein the sensing operation module comprises at least one IR receiver and at least one IR emitter.

5. The electronic device according to claim 1, wherein the electronic device further has a third operating mode, wherein when the electronic device executes the third operating mode, the processor enables the illumination module to generate a low color temperature light and simultaneously enables the image projection module to project a completely black screen onto the plane, or disables the image projection module to make the image projection module in a turn-off state.

6. The electronic device according to claim 5, further comprising:
a light sensor, coupled to the processor and the illumination module, for sensing an ambient light brightness within a range where the electronic device locates, wherein when the ambient light brightness is higher than a threshold, the processor disables the illumination module to generate the medium color temperature light, the high color temperature light or the low color temperature light.

7. An operating method of an electronic device, the electronic device comprising an illumination module, an image projection module, a camera module and at least one processor, and the operating method comprising:
configuring the processor to determine that the electronic device executes a first operating mode or a second operating mode according to an operation instruction of a user;
when the first operating mode is executed, configuring the processor to enable the illumination module to generate a medium color temperature light, simultaneously enable the image projection module to project a window screen onto a plane, and allow the user to operate the window screen on the plane;
and when the second operating mode is executed, configuring the processor to enable the illumination module to generate a high color temperature light, simultaneously enable the image projection module to project a preset pattern onto the plane, and turn on the camera module to allow the user to take at least one photo or image.

8. The operating method according to claim 7, wherein the window screen projected by the image projection module is an operation system screen or a program execution screen.

9. The operating method according to claim 7, wherein the electronic device further comprises a sensing operation module, wherein when the electronic device executes the first operating mode, the processor enables the sensing operation module to sense the user's operation on the window screen.

10. The operating method according to claim 7, wherein the electronic device further has a third operating mode, and the operating method further comprises:
configuring the processor to determine that the electronic device executes the first, second or third operating mode according to the operation instruction of the user; and
when the electronic device executes the third operating mode, configuring the processor to enable the illumination module to generate a low color temperature light and simultaneously enable the image projection module to project a completely black screen onto the plane, or disable the image projection module to make the image projection module in a turn-off state.

11. The operating method according to claim 10, wherein the illumination module comprises a high color temperature illumination element and a low color temperature illumination element, the electronic device further comprises a light sensor, and the light sensor is used to sense an ambient light brightness within a range where the electronic device locates, and the operating method comprises:
when the electronic device executes the first, second or third operating mode, the illumination module dynamically adjusts an illumination brightness and/or luminous flux of the high color temperature illumination element of the low color temperature illumination element and/or the low color temperature illumination element according to the ambient light brightness.

12. The operating method according to claim 11, wherein when the ambient light brightness is higher than a threshold, the processor disables the illumination module to generate the medium color temperature light, the high color temperature light or the low color temperature light.

* * * * *